United States Patent [19]

Schlanger et al.

[11] Patent Number: 4,733,835
[45] Date of Patent: Mar. 29, 1988

[54] CABLE GUIDE FOR BICYCLES

[75] Inventors: Raphael Schlanger, New Rochelle, N.Y.; David Irwin, Newtown; Thomas C. Patterson, Westport, both of Conn.

[73] Assignee: Cannondale Corporation, Georgetown, Conn.

[21] Appl. No.: 854,433

[22] Filed: Apr. 21, 1986

[51] Int. Cl.⁴ .............................................. F16B 15/00
[52] U.S. Cl. ....................................... 248/71; 24/145; 248/73; 248/316.1; 411/41
[58] Field of Search ................... 248/73, 74.1, 49, 65, 248/316.1, 316.2, 71, 68.1; 174/159, 164; 24/145, 691, 115 K; 411/41, 40, 60, 15, 44, 45; 403/398, 399, DIG. 9

[56] References Cited

U.S. PATENT DOCUMENTS

| | | | |
|---|---|---|---|
| 2,937,834 | 5/1960 | Orenick et al. | 248/71 |
| 3,241,797 | 3/1966 | Anderson | 174/159 X |
| 3,703,120 | 11/1972 | Van Buren | 411/60 |
| 4,127,250 | 11/1978 | Swick | 174/159 X |
| 4,391,559 | 7/1983 | Mizusawa | 411/41 X |
| 4,579,473 | 4/1986 | Brugger | 411/41 X |
| 4,582,288 | 4/1986 | Ruehl | 248/71 X |
| 4,588,152 | 5/1986 | Ruehl et al. | 411/41 X |

FOREIGN PATENT DOCUMENTS 2081363  2/1982  United Kingdom ............... 248/68.1

*Primary Examiner*—Ramon O. Ramirez
*Attorney, Agent, or Firm*—Brumbaugh, Graves, Donohue & Raymond

[57] ABSTRACT

A cable guide for affixing a cable or the like to a tube of a bicycle frame comprises a body including at least one base portion adapted to seat on the frame member and having at least one hole, a ferrule portion extending up from the base portion and adapted to receive the cable, and a split sleeve portion extending down from the base portion in alignment with the hole and adapted to extend through a hole in the frame tube. A mandrel is received through the hole in the base portion, extends through the split sleeve and expands the legs of the sleeve outwardly into tight engagement with the wall of the hole in the tube and expands the ends of the sleeve outwardly within the tube, whereby the expanded and extended split sleeve retains the guide on the frame tube.

3 Claims, 7 Drawing Figures

CABLE GUIDE FOR BICYCLES

BACKGROUND OF THE INVENTION

The frames of high quality bicycles are usually built with permanent cable guides on the top tubes for the rear brake cables. On conventional steel frames the cable guides are brazed onto the tube, which provides for an attachment that is durable but is difficult to repair and causes local weakening of the tube due to the heat applied during brazing. In aluminum frame bicycles it is known to use die-cast aluminum cable guides fastened by rivets and an adhesive to the top tube. This known system is satisfactory but laborious to install and like brazed cable guides is not easily repaired. Also, with both brazed on and riveted on guides the guides have to be installed before the frame is painted, and the shadows of the guides away from spray gun require special attention in order to get a good finish around and on the guides.

SUMMARY OF THE INVENTION

There is provided, in accordance with the present invention, a cable guide for fixing cable, such as a rear brake cable, to a tube of a bicycle frame that is easy to install, can be produced at low cost, is durably attached to the frame tube, is easy to replace and can be installed after the bicycle frame has been painted. In particular, a cable guide according to the present invention comprises a body having at least one base portion adapted to seat on the frame tube, a ferrule portion extending up from the base portion and adapted to receive a cable and at least one split sleeve portion extending down from the base portion and adapted to extend through a hole into the interior of the tube. The base portion has a hole aligned with the sleeve, and the hole and sleeve receive a mandrel that expands the portion of the the sleeve that is within the tube to a cross-section substantially larger than the hole in the tube, whereby the expanded sleeves retain the guide on the tube.

In a preferred embodiment, the guide has two base portions, each of which has an undersurface adapted to seat on the top tube; the two base portions reside in spaced-apart relation longitudinally of the frame member. The ferrule portion, as viewed in end profile, includes an inverted generally U-shaped portion extending upwardly from each base portion. A top connecting portion joins the upper parts of the two U-shaped portions. The sides and tops of the U-shaped portions and the top connecting portion engage the sides and top of a segment of the brake cable. Preferably, each base portion further includes an upwardly facing concavity adapted to receive the undersides of segments of the cable in nested relation. Furthermore, it is preferred that the undersurface of the top connecting portion, the undersurface of the loop part of each U-shaped portion and the surfaces of the concavities be circular cylindrical surfaces of substantially equal radii and having a common axis. Accordingly, an end profile, the guide ferrule portion is internally circular and is defined by the aforesaid surfaces.

Advantageously, the body and mandrels of the guide are formed integrally from a polymeric material, the tips of the mandrels being joined to the body along severable membrane junctures at the upper portions of the holes and the tips of the mandrels. Upon installation the mandrels are driven down through the holes and through the split sleeve portions, thereby expanding the sleeve portions to provide attachment of the guide to the tube by spreading-apart of the lower parts of the segments of the split sleeves so that they tightly engage the walls of the receiving holes and spread out within the tube.

For a better understanding of the invention, reference may be made to the following description of an exemplary embodiment, taken in conjunction with the figures of the accompanying drawings.

DESCRIPTION OF THE EMBODIMENT

Figure 7:
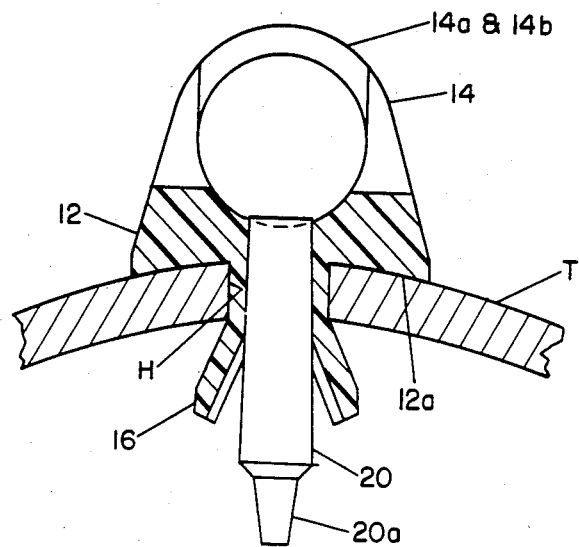
FIG. 7 is an end cross-sectional view similar to FIG. 6 but shows the cable guide installed on a bicycle top tube.

The embodiment shown in the drawings comprises a body 10 having a pair of base portions 12, a ferrule portion 14 extending up from the base portions and adapted to receive the cable, and a pair of split sleeve portions 16 extending down from the base portions and adapted to pass through holes H in the bicycle frame tube T (see FIG. 7). Each base portion 12 includes a hole 18 that is aligned with the respective sleeve 16. The cable guide further includes a pair of mandrels 20, each of which is adapted to be driven down through the hole 18 and sleeve 16 and to expand the legs of the sleeve outwardly into firm engagement with the walls of the hole H and spread the parts of the legs within tube apart, such that the expanded sleeves affix the cable guide to the tube T (see FIG. 7).

Figure 3:
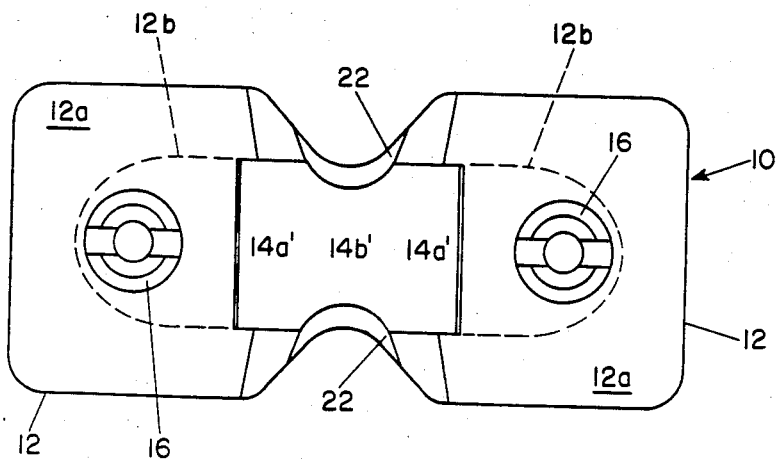
FIG. 3 is a bottom plan view of the embodiment.
Figure 6:
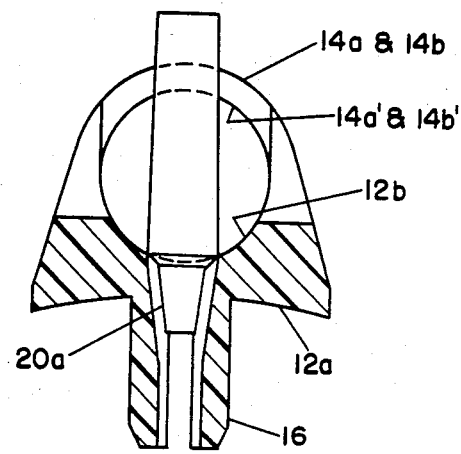
FIG. 6 is an end cross-sectional view taken generally along the lines 6—6 of FIG. 2 and in the direction of the arrows.

The undersurface 12a of each base portion 12 of the guide is a cylindrical surface having a radius substantially equal to the outside radius of the frame tube of the bicycle so that the guide will seat firmly on the tube. The ferrule 14 is defined by two inverted U-shaped portions 14a (U-shaped in end profile—see FIGS. 4 and 6), one of which extends upwardly from each base portion, by a top connecting portion 14b joining the loops of the "U"s of the portions 14a and by concavities 12b on the upper surfaces of the base portions 12. The internal surfaces 14a' of the loops of the U-shaped portions 14a and the internal surface 14b' of the top connecting portion 14b are contiguous such that they together form a semi-cylindrical surface having a diameter slightly larger than the outside diameter of the brake cable. Likewise, the concavities 12b are semi-cylindrical surfaces of the same diameter as and having a common axis with the surfaces 14a' and 14b'. Hence the surfaces 14a' and 14b' and the concavities 12b constitute the vestigial surfaces of a cylindrical hole extending lengthwise of the guide body 10 (see FIGS. 3 and 6) and have a diameter slightly greater than that of the cable (so the cable can be pulled through).

Figure 1:
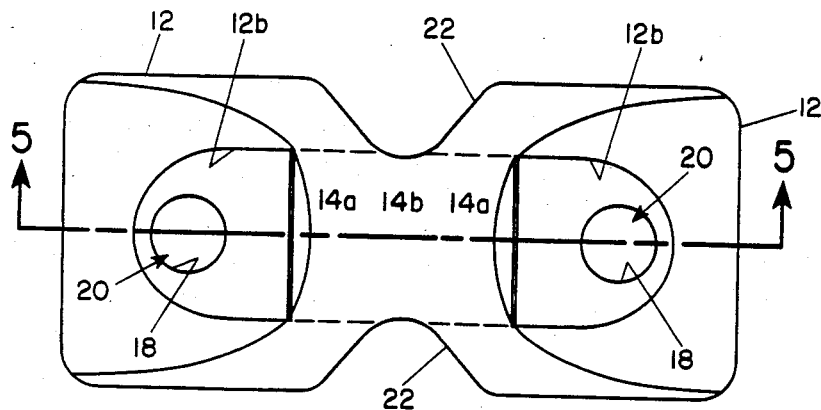
FIG. 1 is a top plan view of the embodiment.
Figure 2:
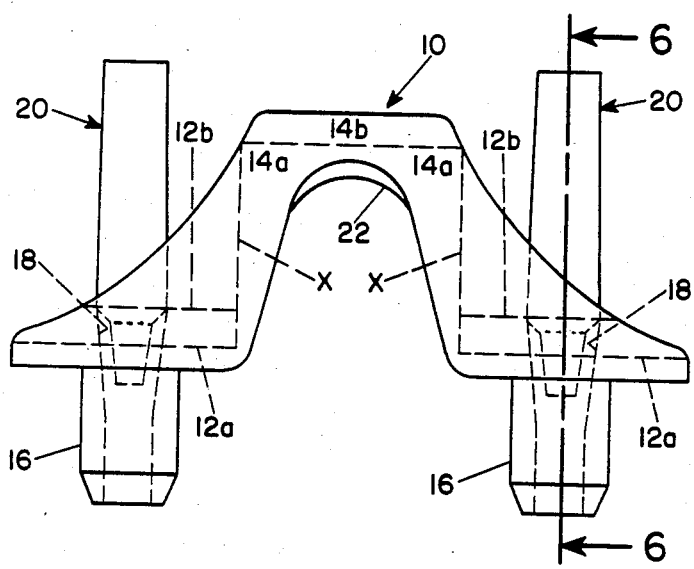
FIG. 2 is a side elevational view of the embodiment.
Figure 4:
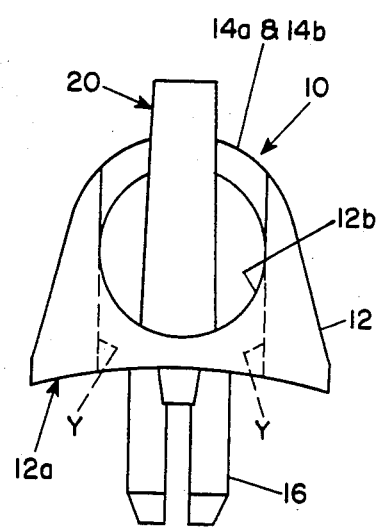
FIG. 4 is an end elevational view the embodiment.
Figure 5:
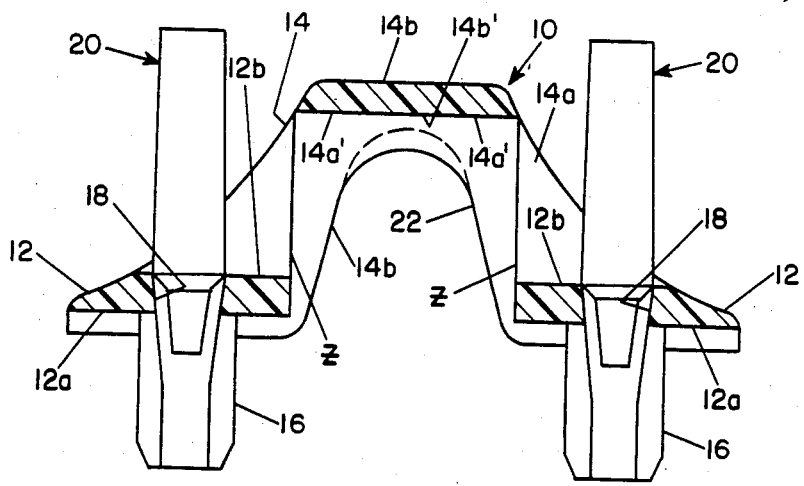
FIG. 5 is a side cross-sectional view of the embodiment taken along the medial-longitudinal plane, as indicated by the lines 5—5 in FIG. 1.

The guide is produced by injection-molding from a single-pull mold set. The surfaces 14a' and 14b' are formed by a male mold portion that extends up between the two base portions 12 of the guide, has parallel flat end faces corresponding to the dashed lines X (FIG. 2) and has parallel flat side surfaces at each side corresponding to the lines Y (FIG. 4). The sides of this mold component have bosses that form the arch-shaped openings 22 in each side of the guide. The concavities 12b are formed by a pair of male mold elements that straddle the mold element (just described) that forms the surfaces 14a' and 14b' and have parallel end faces that correspond to the dashed lines X. The solid lines Z in FIG. 5 represent the breaks between the portions formed by these three male mold elements, and the overlapping, closely adjacent portions of the end faces of the three mold elements provide the two circular holes defined by the adjacent edges of the surfaces 14a' and the concavities 12b.

The mandrels 20 have conical tips 20a that facilitate their forced entry into the split sleeve portions 16 when the guide is installed. The brake cable overlies the head ends of the mandrels and conceals them.

If the guide should be dislodged from the tube or broken, replacement is very simple—a new guide is installed by positioning it in place on the bicycle top tube with the split sleeves in place in the holes and driving the mandrels home. If a guide breaks but one or both bases remain intact on the tube, the remaining parts of the guide can be removed by driving the mandrels all the way through the sleeves and into the tube and then pulling the broken guide parts out of the holes.

The embodiment is intended for use on the top tube of a bicycle to hold the rear brake cable. The invention can be used on any of the bicycle frame tubes for other cables or cable-like components such as the gear shifter cables.

I claim:

1. A cable guide for affixing a brake cable or the like to a tube of a bicycle frame comprising a body including two base portions, each having and upwardly facing surface and having a concave undersurface adapted to seat on the frame tube in spaced-apart relation longitudinally thereof from the other base portion, and each base portion having at least one hole extending therethrough, a ferrule portion extending up from the base portion and adapted to receive the cable, the ferrule portion including in end profile inverted generally U-shaped portions extending upwardly from each base portion and a top connecting portion joining the upper parts of the U-shaped portions, the ferrule portions adapted to receive the cable in substantially parallel relationship to the base portions with the top connecting portion overlying the cable and the base portions underlying it, and a split sleeve portion extending down from each base portion in alignment with the hole and adapted to extend through a hole in the frame tube, and a mandrel adapted to be received through the hole in each base portion and to extend through the sleeve and to expand the legs of the sleeve outwardly into tight engagement with the wall of the hole in the tube and expand the ends of the split sleeve outwardly within the tube, whereby the expanded sleeves retain the guide on the frame tube.

2. A cable guide according to claim 1 wherein each base portion includes an upwardly facing concavity adapted to receive a portion of the cable in nested relation.

3. A cable guide according to claim 2 wherein the undersurface of the top connecting portion, the undersurfaces of each U-shaped portion and the surfaces of the concavities are circular cylindrical surfaces of substantially equal diameters and have a common axis, whereby in end profile the guide ferrule portion is internally circular and is defined by the aforesaid surfaces.

* * * * *